United States Patent Office 3,164,786
Patented Jan. 5, 1965

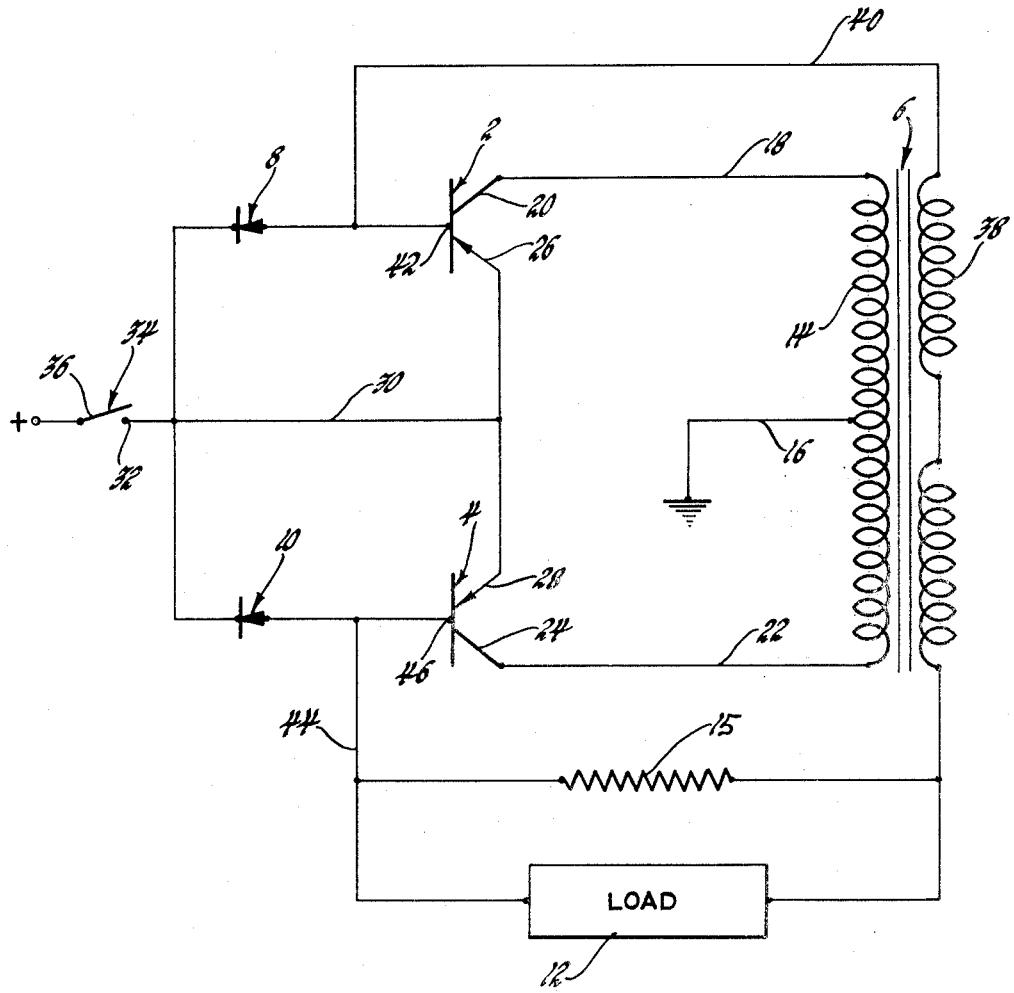

3,164,786
TRANSISTOR OSCILLATOR INVERTER WITH SERIES LOAD IN FEEDBACK CIRCUIT
Douglas G. Wilson, Kokomo, Ind., assignor to General Motors Corporation, Detroit, Mich., a corporation of Delaware
Filed Dec. 20, 1961, Ser. No. 160,845
2 Claims. (Cl. 331—113)

This invention relates to power inverter means or more specifically to a transistorized circuit for converting low voltage D.C. power to higher voltage A.C. power.

There are many instances where only low voltage battery sources are available that conventional 60 cycle, 120 volt A.C. power is required to operate certain equipment. This most frequently occurs in field operation for radio amateurs or hobby application and necessitates the provision of light portable, simple inverter means.

It is an object in making this invention to provide a transistorized oscillator-inverter system having no moving parts for converting low voltage D.C. to higher voltage A.C. power.

It is a further object in making this invention to provide a simplified, economical transistorized inverter system having a minimum number of parts and providing a low power output.

With these and other objects in view which will become apparent as the specification proceeds, my invention will be best understood by reference to the following specification and claims and the illustrations in the accompanying drawing, in which:

The figure is a circuit diagram of a transistor-oscillator inverter system embodying my invention.

This system includes a minimum number of component parts and consists essentially of two power transistors 2 and 4, a transformer 6 and a pair of diode rectifiers 8 and 10. The elements listed are so connected together that the two transistors alternately conduct to energize opposite halves of a primary winding of the transformer to induce an alternating current in the secondary winding which is applicable to the load. The rectifiers perform a semi-switching function and provide a shunt path around a portion of the transistor with which it is associated during one-half cycle. The output of the secondary is connected to a load 12 which is shunted by a resistance 15 whose purpose is to stabilize the output current at low load values.

The primary winding 14 of the transformer 6 is provided with a center tap which is grounded through line 16. The upper terminal of the primary is connected through line 18 with the collector electrode 20 of transistor 2. In like manner the lower terminal of the primary winding 14 is connected through conductor 22 to collector electrode 24 of the transistor 4. The emitter electrodes 26 and 28 of the transistors 2 and 4, respectively, are commonly connected together and through conductor 30 to a stationary contact 32 of an Off-On switch 34. The movable arm 36 of this switch is connected directly to the positive terminal of a source of direct current such as a battery. Conductor 30 is also connected to both cathodes of the diodes 8 and 10. The secondary winding 38 of the transformer 6 has its upper terminal connected through line 40 to a point intermediate diode 8 and the base electrode 42 of transistor 2. The lower terminal of the secondary winding is connected to one side of the load 12 and also to one terminal of the resistor 15 connected in shunt therewith. Conductor 44 extends from the other side of the load 12 to a point intermediate diode 10 and base electrode 46 and transistor 4. Conductor 44 is also connected to the remaining terminal of shunt resistance 14.

When switch 34 is closed to complete the circuit, D.C. voltage is applied to conductor 30. A slight unbalance in conductivity exists normally between transistors 2 and 4. Assuming that the circuit through transistor 2 is slightly more conductive than that through transistor 4 current will immediately begin to flow from the battery through switch 34, line 30, emitter-electrode 26 through the body of transistor 2, collector electrode 20, conductor 18, the upper half of primary 14, conductor 16 to ground. This will induce a current in the secondary winding causing polarity in the secondary winding to be negative at the top and positive at the bottom. This polarity will tend to further bias transistor 2 to become more conductive or turn it on since the upper end of the winding 38 is connected to the base 42. This action is accumulative until the transformer becomes saturated at which time no further increase in current occurs. This requires only a small time period on the order of a fraction of a millisecond and at this time a supply voltage is produced by the secondary. By proper design of the turn ratio in the transformer the desired output voltage may be obtained across the load.

Secondary current will flow at this time through the base-emitter junction of transistor 2 since it is forward biased and conducting. The secondary circuit may be traced as follows: From winding 38 through the load 12 and resistor 15, line 44 through diode 10, conductor 30, emitter 26, base 42, conductor 40, back to winding 38. The current is prevented from flowing through transistor 4 because of the high back impedance of the unit and, therefore, the current has to flow through the diode 10. Of course, any current that flows in the load circuit actually flows in the parallel circuits of the load and resistance 15, which as before mentioned, is provided to allow oscillation of the system at light loads.

When the transformer becomes saturated and there is no further increase in current the induced voltage decreases, reducing the base drive current to the transistor 2. This transistor then ceases to conduct at the same time, changing the bias on transistor 4 so that that transistor now begins to conduct switching to the other half of the primary and current flows from the battery through switch 34, line 30, emitter-electrode 28, the body of transistor 4, collector electrode 24, conductor 22 through the lower half of transformer primary 14, conductor 16 to ground. This now induces current in the secondary winding 38 which produces a forward bias on transistor 4 in the same manner as previously described and this transistor goes into full conduction quickly cutting off transistor 2 and the second half cycle results. The secondary current induced in this half cycle is of the opposite polarity to that first described and the secondary current flows through diode 8 bypassing transistor 2 and through the emitter-base circuit of transistor 4. This operation continues as long as the switch 34 is closed to produce alternating voltage across the load circuit to energize the same.

The output of the oscillator produces a square wave voltage whose frequency is governed by the following equation.

$$f = \frac{E_{bb} \times 10^8}{4 \times B_s \times A \times N}$$

in which $E_{bb}$ is the D.C. voltage, N is one-half the number of primary turns of the transformer, $B_s$ is the saturation flux density in lines per square inch, and A the effective core area in inches. This circuit provides base drive current in proportion to load power output. The efficiency is fairly uniform over a considerable range of output. It does not maintain constant frequency output but in many instances a modest variation in frequency can be tolerated.

What is claimed is:
1. A circuit arrangement for changing D.C. to A.C.

voltage comprising, a transformer having a primary and a secondary winding, said primary winding being center tapped and grounded, a pair of transistors having emitter, collector and base electrodes, conductance means connecting the collector electrodes to opposite ends of the primary winding of the transformer, a source of D.C. voltage connected to both the emitter electrodes, a rectifier means connected between each base electrode and the source of D.C. voltage, a series output circuit including a load and the secondary winding connected across the base electrodes of the two transistors to provide feedback switching voltage for square wave output, and a resistance in shunt to the load to assist oscillation at light loads.

2. A circuit arrangement for changing D.C. to A.C. voltage comprising, a transformer having a primary and a secondary winding, said primary winding being center tapped and grounded, a pair of transistors having emitter, collector and base electrodes, conductance means connecting the collector electrodes to opposite ends of the primary winding of the transformer, a source of D.C. voltage connected to both the emitter electrodes, a rectifier means connected between each base electrode and the source of D.C. voltage, a series output circuit including a load and the secondary winding connected across the base electrodes of the two transistors to provide feedback switching voltage for square wave output, providing base drive current proportional to the load power output and a uniform efficiency curve over a range of output power, and a resistance in shunt to the load to assist oscillation at light loads.

References Cited in the file of this patent

UNITED STATES PATENTS

| | | |
|---|---|---|
| 2,990,519 | Wagner | June 27, 1961 |
| 2,997,664 | Jensen | Aug. 22, 1961 |
| 3,026,486 | Pintell | Mar. 20, 1962 |
| 3,031,629 | Kadri | Apr. 24, 1962 |
| 3,048,764 | Murphy | Aug. 7, 1962 |
| 3,074,031 | Hoge | Jan. 15, 1963 |